(No Model.)

O. L. NOBLE.
ROTARY CUTTER.

No. 337,698. Patented Mar. 9, 1886.

Witnesses
Lauritz N. Möller
John R. Snow

Inventor
Oscar Legrand Noble
by J. E. Maynadier
his Atty

UNITED STATES PATENT OFFICE.

OSCAR L. NOBLE, OF BOSTON, MASSACHUSETTS, ASSIGNOR TO HOMER ROGERS, TRUSTEE, OF SAME PLACE.

ROTARY CUTTER.

SPECIFICATION forming part of Letters Patent No. 337,698, dated March 9, 1886.

Application filed January 2, 1886. Serial No. 187,337. (No model.)

*To all whom it may concern:*

Be it known that I, OSCAR L. NOBLE, of Boston, in the county of Suffolk and State of Massachusetts, have invented a new and useful Improvement in Rotary Cutters, of which the following is a specification, reference being had to the accompanying drawings, in which—

Figure 1:
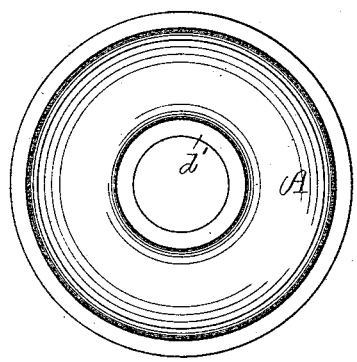
Figure 2:
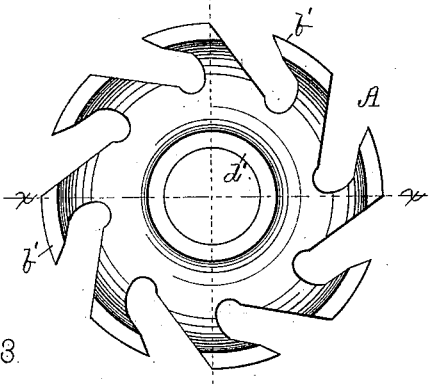
Figure 3:
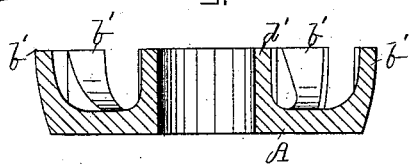
Figure 4:
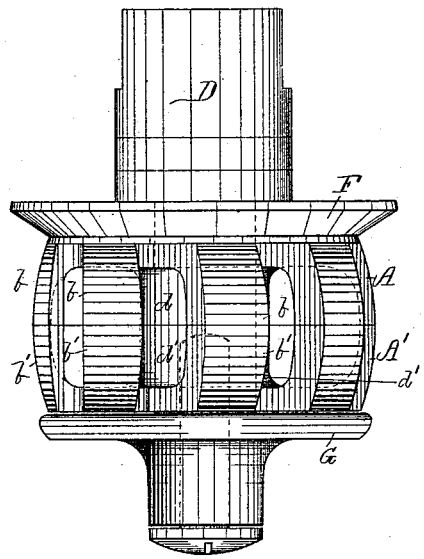
Figure 5:
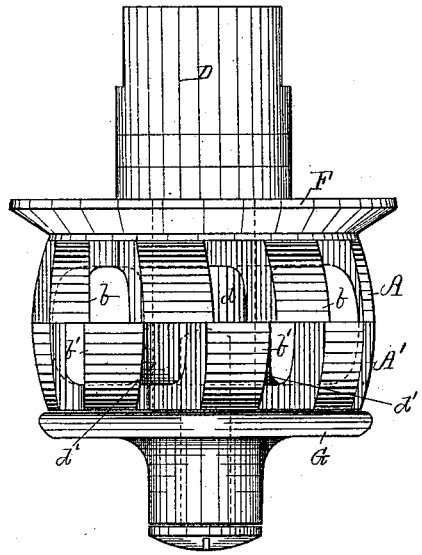

Figure 1 is an elevation of a blank to be slotted to form teeth; Fig. 2, an elevation of same blank slotted to form teeth; Fig. 3, a section on line $x$ $x$ of Fig. 2. Figs. 4 and 5 are elevations of my cutter, one showing the teeth forming continuous cutting-edges and the other showing the slotted blanks in such relation to each other that the teeth do not form continuous cutting-edges.

The invention consists in a rotary cutter made up of two disks, a separating-sleeve, and a series of teeth projecting inwardly from the disks, as more fully described below.

In the drawings, A A' represent the two disks; $b$ $b'$, the teeth, and $d$ $d'$ the sleeve, shown in this instance as in two parts, one integral with one disk, the other with the other disk; but this, as will be clear, is simply for convenience in construction, for the sleeve may be a single piece between the two disks. The arbor is marked D, and as the cutter shown is designed for trimming heels I have also shown guards F and G, which will be understood by all skilled in the art of finishing the soles and heels of boots and shoes without further description; for, as will be clear, while my improved rotary cutter is shown as a heel-trimmer, it is applicable to many other uses.

That form of my cutter shown in the drawings is made from two pieces of steel, each piece being a disk with a central hub, as shown in Fig. 1. These pieces are then slotted, as shown in Fig. 2, to form the teeth $b$ or $b'$. Clearance is given to these teeth in any usual way. The two pieces when put together on an arbor, D, and clamped in place on the arbor form a complete rotary cutter, the cutting-edges of the teeth $b$ $b'$ forming either a continuous cutting-edge, as in Fig. 4, or a broken cutting-edge, as in Fig. 5, the latter being preferable for some uses, while the former is preferable for other uses, and essential when the cutter is to be ground at one grinding. The shape of the cutting-edge is determined, of course, by the shape to be cut.

The main advantage of my improved cutter is that the parts are kept in proper relation by the hubs $d$ $d'$, no matter how much the teeth be ground away.

What I claim is—

The rotary cutter above described, consisting of disks A A', having teeth $b$ $b'$, projecting inwardly, and a separating-sleeve, $d$ $d'$, said disks adapted to be secured to a shaft and simultaneously rotated, substantially as and for the purpose set forth.

O. L. NOBLE.

Witnesses:
EDWARD S. BEACH,
JOHN R. SNOW.